May 13, 1952     K. C. BUGG ET AL     2,596,648
BALANCE REEL
Filed Dec. 5, 1945     2 SHEETS—SHEET 1
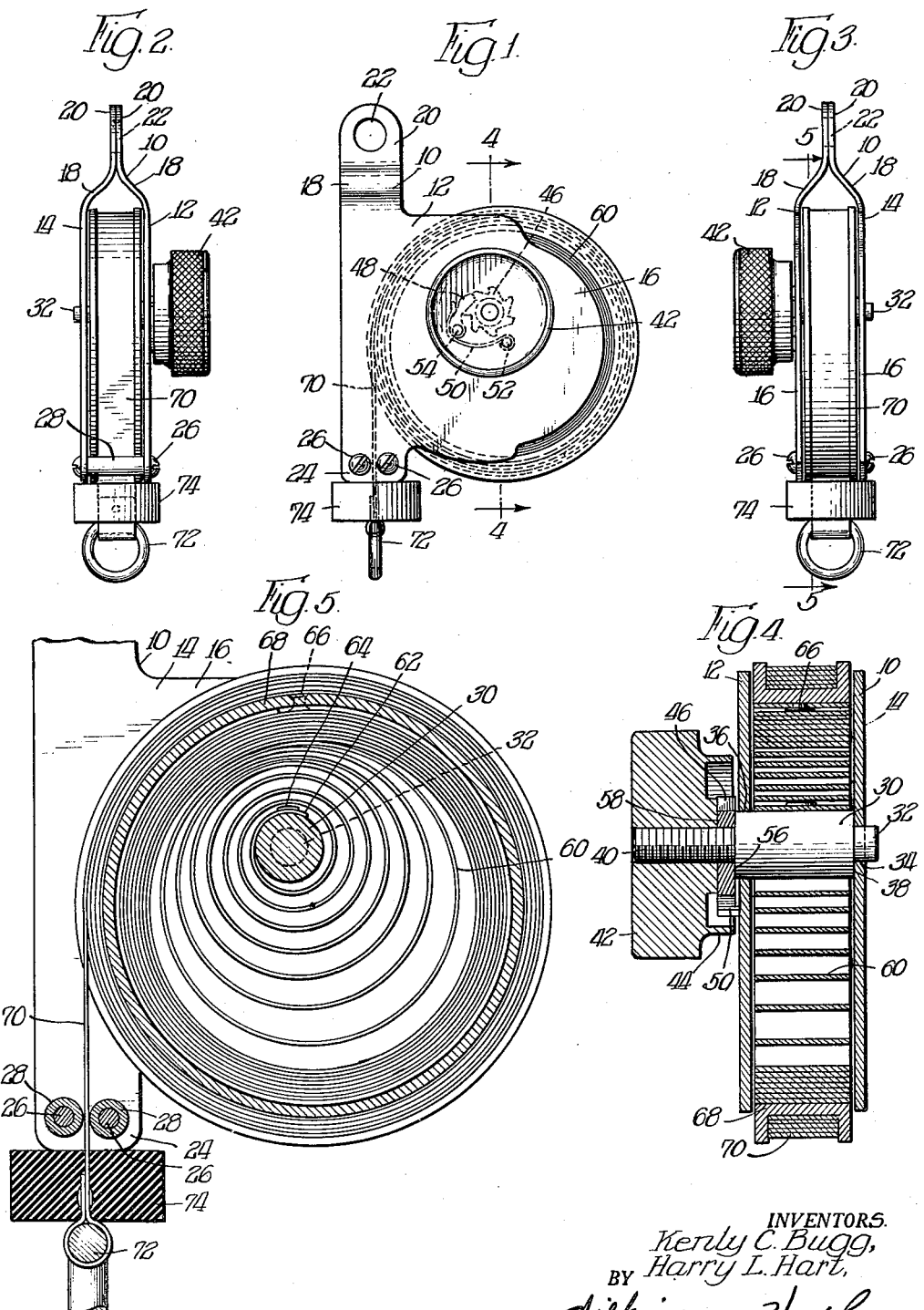
INVENTORS.
Kenly C. Bugg,
Harry L. Hart,
BY
ATTYS.

May 13, 1952     K. C. BUGG ET AL     2,596,648
BALANCE REEL
Filed Dec. 5, 1945     2 SHEETS—SHEET 2
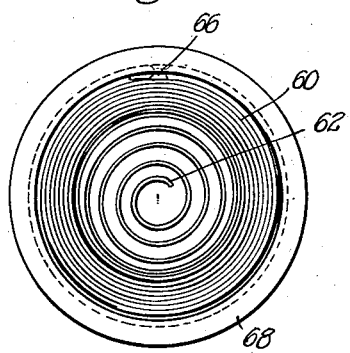
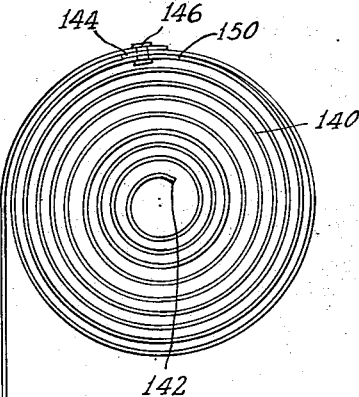
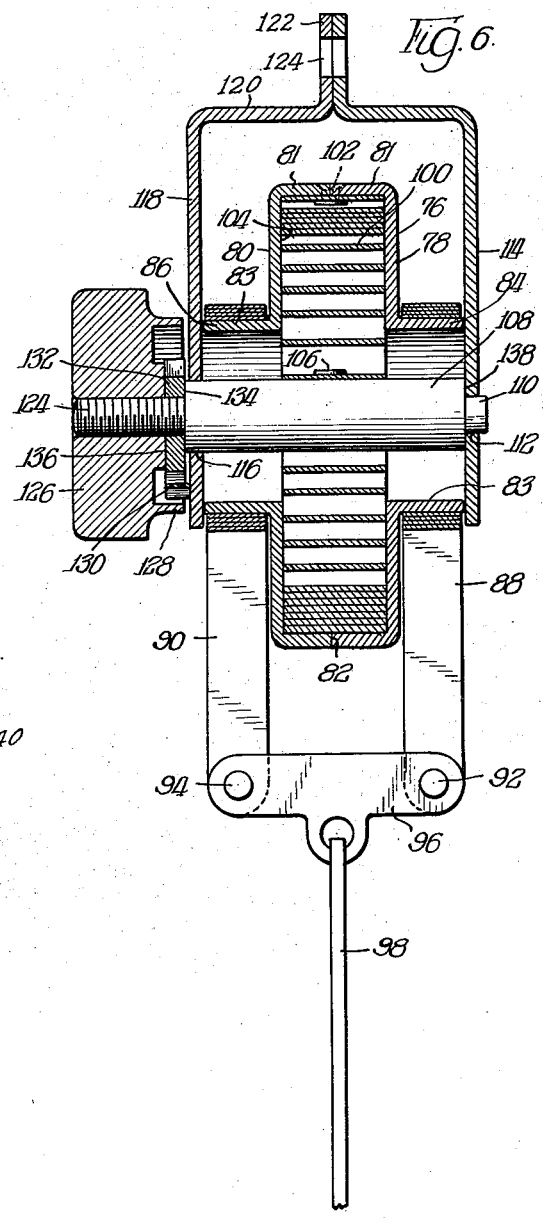
INVENTORS.
Kenly C Bugg,
Harry L Hart,
BY Patented May 13, 1952

2,596,648

UNITED STATES PATENT OFFICE 2,596,648

BALANCE REEL

Kenly C. Bugg and Harry L. Hart, Fort Wayne, Ind.; said Hart assignor to said Bugg Application December 5, 1945, Serial No. 632,933

16 Claims. (Cl. 242—107)

1

This invention pertains to balance reels adapted for use in holding work tools in a predetermined selected position.

An object of the invention is to provide a reel wherein the supporting rim or housing of the power spring becomes the peripheral surface for the tool holding tape;

Another object of the invention is to provide a balance reel wherein the power spring is supported on a center shaft and flexible with respect to the supporting rim of the tape whereby the weight load is supported at a mechanical advantage dependent upon the change of the radii of the spring;

Another object of the invention is to provide a balance reel or the like wherein part of the spring is used as a controllable factor of the adjusting elements;

Another object of the invention is to provide adjusting means for a balance reel wherein the operator can adjust the range of support through small increments;

Another object of the invention is to provide nut clutch adjusting means for balancing reels or the like;

Another object of the invention is to provide a reel with the most favorable safety conditions;

Another object of the invention is to provide a balance reel of simple design wherein weight is reduced considerably;

Another object of the invention is to provide an inexpensive balance reel yet one which is sturdy of construction and sure of operation;

Another object of the invention is to provide a balancing reel which performs in the manner desired yet is bearingless;

Another object of the invention is to provide a balancing reel with the assembly in a safeguarded condition as the balancing spring is encased in a rim whereby breakage is reduced to a minimum;

Another object of the invention is to provide a balancing reel wherein the power spring is fastened to an adjustable shaft so that the reel can be adjusted without tools or back slip.

With these and various other objects in view, the invention may consist of certain novel features of construction and operation as will be more fully described and particularly pointed out in the specification, drawings and claims appended hereto.

In the drawings which illustrate embodiments of the device wherein like reference characters are used to designate like parts:

2

Figure 1 is a side elevation of one form of balance reel embodying the invention, the same looking toward the left as viewed in Figure 2;

Figure 2 is a rear end elevation of the balance reel illustrated in Figure 1, the same looking toward the right as viewed in Figure 1;

Figure 3 is an end elevation of the reel illustrated in Figures 1 and 2, the same looking toward the left as viewed in Figure 1;

Figure 4 is an enlarged sectional elevation taken substantially in the plane as indicated by the line 4—4 of Figure 1;

Figure 5 is a fragmentary sectional elevation taken substantially in the plane as indicated by the line 5—5 of Figure 3;

Figure 6 is an enlarged sectional elevation corresponding to Figure 4, showing a modified form of balance reel embodying the invention;

Figure 7 is an enlarged elevation showing one form of retracting and balance spring and housing arrangement for the reel illustrated in Figure 1; and, Figure 8 is an elevation corresponding to Figure 7 showing a modified form of retracting and balance spring assembly.

Referring first of all more particularly to the construction shown in Figures 1 to 4 inclusive, and 7, the balance reel includes the housing 10, which, as shown, consists of plates 12 and 14. Plates 12 and 14 are mating plates and comprise the spaced brackets 16 provided with flanged portions 18, reflanged to form contacting supporting ears 20 apertured as at 22 for the reception of suitable supporting means (not shown). The brackets 16 are provided with the spaced, depending flanges 24 which are secured together by means of the spaced bolts 26 having spacing sleeves 28 thereon which are spaced apart from each other to form a guide passage therebetween.

Shaft 30 is disposed between the plates 12 and 14, said shaft being provided with the smaller pivotal shaft 32 rotatable in a suitable aperture 34 provided in plate 14, the shaft 30, in the plane of plate 12, being rotatably mounted in a suitable aperture 36 in plate 12. Thus it will be seen that shaft 30 itself is rotatable in plate 12 while shaft 32 is rotatable in plate 14, shaft 30 abutting plate 14 as at 38. Shaft 30 is provided with the threaded portion or projection 40 for the reception of threads of the adjusting knob 42, the knob being skirted as at 44 to house the ratchet 46, pawl 48 and spring 50.

Spring 50 is secured as at 52 to the plate 12; pawl 48 is pivoted to plate 12 as at 54, while ratchet 46 is rotatably mounted on the threaded portion 40, but abuts the shaft 30 as at 56, the abutting portion of the shaft projecting slightly beyond the plate 12. The other side of ratchet 46 abuts the knob 42 as at 58 whereby an adjusting nut clutch is formed between knob 42, ratchet 46 and shaft 30. Retracting coil spring 60 is secured at its inner end 62 to the shaft 30 as at 64, the outer end of said spring being secured as at 66 to the rim or supporting tape housing 68. The spring is wound in such a direction (clockwise in Figures 1 and 5), and the pawl and ratchet are so faced that rotation of the adjusting knob 42 in a clockwise direction as viewed in Figure 1 tends to wind up the spring, that is, rotate the rim 68 in a clockwise direction. The spring 60 is eccentrically mounted with respect to the shaft 30 and housing 68 to provide an axle support for the weight 72 and the housing 68. In operation the spring will compress itself and serves as a non-bearing axle against the action of the weight 72 and housing 68. The supporting tape 70 has its inner end secured to the rim 68, is wound on the rim in a direction opposite to that of spring 60, and extends downwardly between the space between the sleeves 28. The outer end of tape 70 is provided with securing means 72 for supporting a suitable work tool, a rubber or other resilient block or plug 74 being preferably provided for absorbing shock in the event spring 60 is under a predetermined tension.

Thus in this form of the device when it is desired to tighten spring 60 the adjusting knob is rotated in a clockwise direction as viewed in Figure 1. This causes rotation of the shaft 30 and the ratchet 46, inasmuch as the ratchet 46 is frictionally held between the knob 42 and the shaft 30. The pawl will thus hold the ratchet in selected positions maintaining the spring 60 in its predetermined wound (energized) condition.

When it is desired to lower the tape 70 or the tool supported on the securing means 72, that is, when it is desired to adjust the reel, the knob 42 is rotated in a counterclockwise direction as viewed in Figure 1, which slightly relieves the friction connection between knob 42, ratchet 46 and shaft 30 for any small movement of the knob. The spring 60, being under tension, immediately rotates shaft 30 (in a counterclockwise direction) which will cause the threaded portion 40 to rotate (counterclockwise) to cause the ratchet 46 to be tightened against shaft 30. Continued increments of rotation of the knob 42 in a counterclockwise direction causes this increment of adjustment to continuously take place until the desired amount of tape 70 is unwound from the rim 68 to attain the required balance.

The construction illustrated in Figure 6 shows a reel for a somewhat heavier installation. In this case the reel comprises the housing 76 which includes the spaced mating plates 78 and 80 joined as by their top flanges 81 at 82 as by welding or other means. The plates 78 and 80 are provided with the outwardly extending central flanges 83 forming tape tracks 84 and 86, on which flexible tapes 88 and 90 are wound, the inner ends of said tapes being connected to the tracks 84 and 86. The outer ends of said tapes are connected as at 92 and 94 to the cross head 96 which in turn in provided with supporting means 98 for connection to a suitable tool to be balanced.

The outer end of the balancing spring 100 is connected as at 102 to the housing 76 extending into the spring recess 104 provided in said housing. The inner end of said spring 100 is connected as at 106 to the shaft 108. Shaft 108 is provided with the pivoting shaft 110 rotatably mounted in the aperture 112 provided in bracket side plate 114, and shaft 108 extends slightly through aperture 116 provided in bracket side plate 118, the shaft being journalled in said plate. The bracket side plates 118 are flanged and reflanged as at 120 and 122, being secured together by flanges 122, flanges 122 being apertured as at 124 to provide a supporting eye. Shaft 108 is provided with the threaded portion 124 adapted to have threaded cooperation with cooperating threads in the adjusting knob 126.

Knob 126 is provided with the skirted portion 128, housing the pawl (not shown) similar to pawl 46, and pivoted to plate 118, spring 130, similar to spring 50 being provided on said plate 118, urging said pawl into engagement with the ratchet 132. Ratchet 132 is thus frictionally engaged between the end 134 of shaft 108 and the surface 136 on knob 126, the other end 138 of shaft 108 abutting plate 114.

In its adjusting or balancing operation and function the modification illustrated in Figure 6 is similar to that illustrated in Figures 1 to 5 inclusive, it being seen that tapes 88 and 90 are supported on tracks 84 and 86, and are played out or taken up thereon by means of the adjustment of the knob 118, which adjusts the nut clutch formed by knob 126, ratchet 132 and shaft 108, the pawl (not shown) serving as arresting means for shaft 108, when the shaft 108 has rotated to cause the threaded portion 124 and the knob 126 to tightly secure the ratchet 132 between said knob 126 and shaft 108.

Spring 60 (Figure 1) may be replaced with spring 140 (Figure 8) the inner end 142 of which is adapted to be connected to the shaft 30 (Figure 1), the outer end 144 being secured as at 146 to the inner end of the supporting tape 148 and through a convolution 150 of said spring whereby in effect a rim of 360° is formed by the outer convolution of the spring 140. As before spring 140 and tape 148 are coiled in opposite directions. The operation of the device shown in Figure 1 having spring 140 therein is the same as has already been described.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

We claim:

1. A balance reel comprising a housing provided with supporting means and spaced side plates, a shaft rotatably mounted on said plates, said shaft having an end extending outwardly of one of said plates and being provided with a threaded portion, an adjusting knob threaded to said threaded portion, a ratchet disposed on said threaded portion and adapted to be fixed between said knob and extending end by moving said knob toward said shaft by the threads of said knob and threaded portion, a spring pressed pawl mounted on one of said side plates and cooperating with said ratchet for holding said ratchet in predetermined positions, a balancing spring between said side plates having one end secured to said shaft, a rim outside said spring, the other end of said spring being secured to said rim, a flexible supporting member having one end secured to said rim and being wound thereon, and a guide for said flexible member carried by said housing.

2. A balance reel comprising a housing provided with supporting means and spaced side plates, a shaft rotatably mounted on said plates, said shaft having an end extending outwardly of one of said plates and being provided with a threaded portion, an adjusting knob threaded to said threaded portion, a ratchet disposed on said threaded portion and adapted to be fixed between said knob and extending end by moving said knob toward said shaft by the threads of said knob and threaded portion, a spring pressed pawl mounted on one of said side plates and cooperating with said ratchet for holding said ratchet in predetermined positions, a balancing spring between said side plates having one end secured to said shaft, a rim, the other end of said spring being secured to said rim, and a flexible supporting member having one end secured to said rim and being wound thereon.

3. A balance reel comprising a housing provided with supporting means and spaced side plates, a shaft rotatably mounted on said plates, said shaft having a threaded member thereon, an adjusting knob threaded to said threaded member, means controlled by said knob for selectively positioning said shaft, said means including a member carried by said shaft and a member coacting with said first named member of said means and disposed on one of said side plates, the position of said first named member of said means being adapted to be selectively varied with respect to said shaft, said first named member of said means being held in selected position between said shaft and knob, a balancing spring between said side plates having one end secured to said shaft, a flexible supporting member having one end fixed with respect to the other end of said spring, and a guide for said flexible member carried by said housing.

4. A balance reel comprising a housing provided with supporting means and spaced side plates, a shaft rotatably mounted on said plates, means for selectively holding said shaft in different positions, said means including a member carried by said shaft and a member coacting with said first named member of said means and disposed on one of said side plates, the position of said first named member of said means being adapted to be selectively varied with respect to said shaft, said first named member of said means being held in selected position between said shaft and knob, a balancing spring between said side plates having one end secured to said shaft, and a flexible supporting member having one end fixed with respect to the other end of said spring.

5. A balance reel comprising a housing provided with supporting means and spaced side plates, a shaft rotatably mounted on said plates, means for selectively holding said shaft in different positions, said means including a member carried by said shaft and a member coacting with said first named member of said means and disposed on one of said side plates, the position of said first named member of said means being adapted to be selectively varied with respect to said shaft, said first named member of said means being held in selected position between said shaft and knob, a balancing spring between said side plates having one end secured to said shaft, and a flexible supporting member having one end fixed with respect to the other end of said spring, and a guide for said flexible member carried by said housing.

6. A balance reel comprising a housing provided with supporting means and spaced side plates, a shaft rotatably mounted on said plates, said shaft having an end extending outwardly of one of said plates and being provided with a threaded portion, an adjusting knob threaded to said threaded portion, a ratchet disposed on said threaded portion and adapted to be fixed between said knob and extending end by moving said knob toward said shaft by the threads of said knob and threaded portion, a spring pressed pawl mounted on one of said side plates and cooperating with said ratchet for holding said ratchet in predetermined positions, a balancing spring between said side plates having one end secured to said shaft, the other end of said spring being fastened to a convolution of said spring, and a flexible supporting member having one end secured to said convolution and wound on said spring.

7. A balance reel comprising a housing provided with a spring housing, a support comprising members embracing said housing, a shaft having the ends journalled into said members, one end of said shaft extending beyond one of said members and having a threaded portion, a ratchet rotatable on said threaded portion and engaging the extending end, a spring pressed pawl provided on the adjacent member and cooperating with said ratchet, a knob for securing said ratchet between said extending end and said knob, a balance spring having one end secured to said shaft and the other end secured to said housing, and flexible supporting members each having an end secured to said housing on opposite sides of said spring.

8. A balance reel comprising a housing provided with supporting means, said housing including spaced side plates, a shaft rotatably mounted on said plates, one end of said shaft having a threaded projection, a balancing spring between said plates having the inner end secured to said shaft, a flexible supporting member having one end fixed with respect to the outer end of said spring, the other end of said flexible member being adapted to support an object, an adjusting knob threaded to said threaded projection, a ratchet disposed on said projection and fixed in selected position by said knob, and a pawl pivoted to one of said side plates and engaging the ratchet in selected positions to position said shaft in selected positions with respect to said housing.

9. A balance reel comprising a support, a shaft rotatably mounted on said support, a balancing spring having its inner end connected to said shaft and being coiled around said shaft in a plane substantially normal to the axis of said shaft, a flexible supporting member coiled with respect to said shaft and disposed in a plane normal to the axis of said shaft, the inner end of said supporting member being fixed with respect to the outer end of said spring, a ratchet adjustable to selected positions with respect to said shaft, means for fixing said ratchet to said shaft in selected positions with respect thereto, and a pawl pivotally mounted on said support for engaging the ratchet in selected positions to position said shaft in selected positions with respect to said support.

10. A balance reel comprising a support, a shaft rotatably mounted on said support, a balancing spring having its inner end connected to said shaft and being coiled around said shaft in a plane substantially normal to the axis of said shaft, a flexible supporting member coiled with respect to said shaft and disposed in a plane normal to the axis of said shaft, the inner end of said supporting member being fixed with respect to the outer end of said spring, a ratchet adjustable to selected positions with respect to said shaft, means for fixing said ratchet to said shaft in selected positions with respect thereto, and a pawl pivotally mounted on said support for engaging the ratchet in selected positions to position said shaft in selected positions with respect to said support, said spring and flexible member being coiled in opposite directions.

11. A balance reel comprising a support, a shaft rotatably mounted on said support, a balancing spring having its inner end connected to said shaft and being coiled around said shaft in a plane substantially normal to the axis of said shaft, a flexible supporting member coiled with respect to said shaft and disposed in a plane normal to the axis of said shaft, the inner end of said supporting member being fixed with respect to the outer end of said spring, and means including an adjustable nut clutch mechanism comprising a pawl secured to the support, a ratchet wheel rotatably mounted on the shaft, and means for frictionally clamping the ratchet wheel to the shaft to position and frictionally maintain said shaft in selected positions with respect to said support.

12. A balance reel comprising a support, a shaft rotatably mounted on said support, a balancing spring having its inner end connected to said shaft and being coiled around said shaft in a plane substantially normal to the axis of said shaft, a flexible supporting member coiled with respect to said shaft and disposed in a plane normal to the axis of said shaft, the inner end of said supporting member being fixed with respect to the outer end of said spring, and means including an adjustable nut clutch mechanism comprising a pawl secured to the support, a ratchet wheel rotatably mounted on the shaft, and means for frictionally clamping the ratchet wheel to the shaft to position and frictionally maintain said shaft in selected positions with respect to said support, said spring and flexible member being coiled in opposite directions.

13. A balance reel comprising a support, a shaft rotatably mounted on said support, a balancing spring having its inner end connected to said shaft and being coiled around said shaft in a plane substantially normal to the axis of said shaft, a flexible supporting member coiled with respect to said shaft and disposed in a plane normal to the axis of said shaft, the inner end of said supporting member being fixed with respect to the outer end of said spring, and means including an adjustable nut clutch mechanism comprising a pawl secured to the support, a ratchet wheel rotatably mounted on the shaft, and means for frictionally clamping the ratchet wheel to the shaft to position and frictionally maintain said shaft in selected positions with respect to said support, movement of said last named means to de-energize the spring being in a direction opposite to the pull of said flexible member.

14. A balance reel comprising a support, a shaft rotatably mounted on said support, a balancing spring having its inner end connected to said shaft and being coiled around said shaft in a plane substantially normal to the axis of said shaft, a flexible supporting member coiled with respect to said shaft and disposed in a plane normal to the axis of said shaft, the inner end of said supporting member being fixed with respect to the outer end of said spring, a ratchet adjustable to selected positions with respect to said shaft, means for fixing said ratchet to said shaft in selected positions with respect thereto, and a pawl pivotally mounted on said support for engaging the ratchet in selected positions to position said shaft in selected positions with respect to said support, said spring and flexible member being coiled in opposite directions, movement of said knob to loosen said ratchet with respect to said shaft being in the same direction as the pull on said shaft by said flexible member in unwinding.

15. A balance reel comprising a support, a shaft rotatably mounted on said support, a balancing spring having its inner end connected to said shaft and being coiled around said shaft eccentrically thereof and in a plane substantially normal to the axis of said shaft, a flexible supporting member coiled with respect to said shaft and disposed in a plane normal to the axis of said shaft, the inner end of said supporting member being fixed with respect to the outer end of said spring, a ratchet adjustable to selected positions with respect to said shaft, means for fixing said ratchet to said shaft in selected positions with respect thereto, and a pawl pivotally mounted on said support for engaging the ratchet in selected positions to position said shaft in selected positions with respect to said support.

16. A balance reel comprising a support, a shaft rotatably mounted on said support, a balancing spring having its inner end connected to said shaft and being coiled around said shaft eccentrically thereof and in a plane substantially normal to the axis of said shaft, a flexible supporting member coiled with respect to said shaft and disposed in a plane normal to the axis of said shaft, the inner end of said supporting member being fixed with respect to the outer end of said spring, a ratchet adjustable to selected positions with respect to said shaft, means for fixing said ratchet to said shaft in selected positions with respect thereto, and a pawl pivotally mounted on said support for engaging the ratchet in selected positions to position said shaft in selected positions with respect to said support, movement of said knob to loosen said ratchet with respect to said shaft being in the same direction as the pull on said shaft by said flexible member in unwinding.

KENLY C. BUGG.
HARRY L. HART.

REFERENCES CITED

The following references are of record in the file of this patent:

UNITED STATES PATENTS

| Number | Name | Date |
| --- | --- | --- |
| 390,837 | Bryant et al. | Oct. 9, 1888 |
| 469,934 | Chauncey | Mar. 1, 1892 |
| 649,901 | Brennan | May 22, 1900 |
| 1,975,633 | Cakora | Oct. 2, 1934 |